United States Patent [19]
Brevard et al.

[11] 4,359,200
[45] Nov. 16, 1982

[54] LIMB RETENTION SYSTEM FOR AIRCRAFT EJECTION SEAT

[75] Inventors: Ronald E. Brevard, Fletcher; Gary F. Bradley, Hendersonville, both of N.C.; F. Terry Thomasson, Seattle, Wash.

[73] Assignee: Stencel Aero Engineering Corporation, Arden, N.C.

[21] Appl. No.: 202,496

[22] Filed: Oct. 31, 1980

[51] Int. Cl.³ ............................................. B64D 25/06
[52] U.S. Cl. ............................ 244/122 AG; 280/753; 280/728; 297/216; 297/466
[58] Field of Search ................ 244/122; 280/728, 729, 280/730, 733, 749, 753; 297/216, 466, 487, 488, 465

[56] References Cited

U.S. PATENT DOCUMENTS

| | | | |
|---|---|---|---|
| 3,083,938 | 4/1963 | Brinkworth et al. | 244/122 |
| 3,214,117 | 10/1965 | James et al. | 244/122 |
| 3,218,103 | 11/1965 | Boyce | 297/466 |
| 3,623,768 | 11/1971 | Copener et al. | 280/753 |
| 3,836,168 | 9/1974 | Nonaka et al. | 280/733 |
| 3,901,550 | 8/1975 | Hamy | 280/753 |
| 3,953,049 | 4/1976 | Surace et al. | 280/733 |
| 4,081,156 | 3/1978 | Ideskar | 244/122 |
| 4,215,835 | 8/1980 | Wedgwood | 244/122 AG |

FOREIGN PATENT DOCUMENTS

| | | |
|---|---|---|
| 2653369 | 11/1976 | Fed. Rep. of Germany . |
| 927913 | 6/1963 | United Kingdom . |
| 1316854 | 5/1973 | United Kingdom . |
| 1456007 | 11/1976 | United Kingdom ........ 244/122 AG |
| 1567385 | 5/1980 | United Kingdom . |
| 1570283 | 6/1980 | United Kingdom . |

*Primary Examiner*—Galen L. Barefoot
*Attorney, Agent, or Firm*—Roylance, Abrams, Berdo & Farley

[57] ABSTRACT

A pilot limb retention system for an aircraft ejection seat comprising two main straps, two secondary straps and two nets coupled to the seat. The system includes a stowage assembly and a deployment system for the straps and nets. The stowage assembly comprises two compartments in the seat back and two compartments in the seat pan. The deployment system comprises four inflatable bladders, two adjacent the knees of the pilot on opposite sides of the seat pan and two adjacent the shoulders of the pilot on opposite sides of the seat back. These bladders are also stowed in the compartments and are releasably connected to the main straps.

11 Claims, 15 Drawing Figures

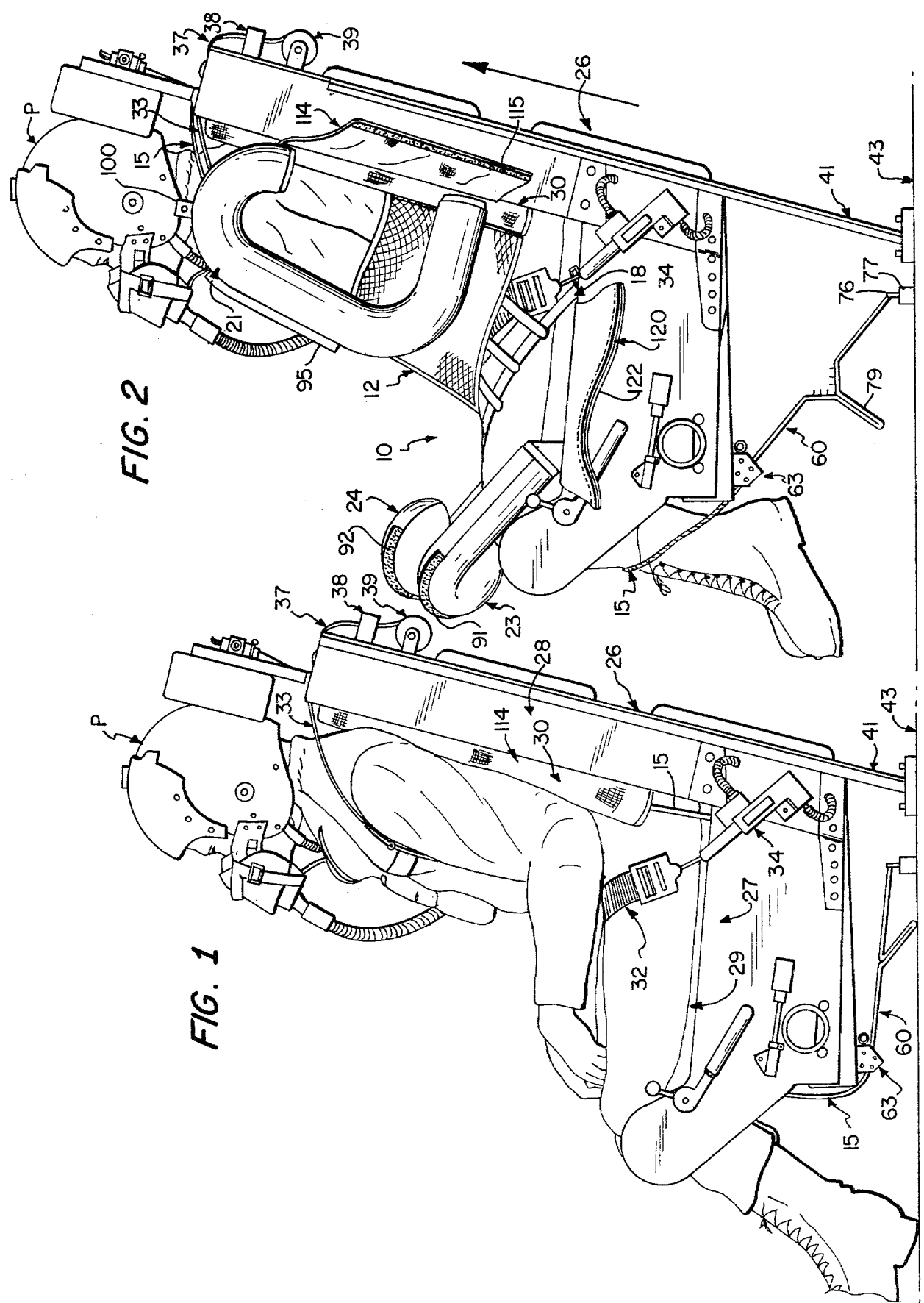

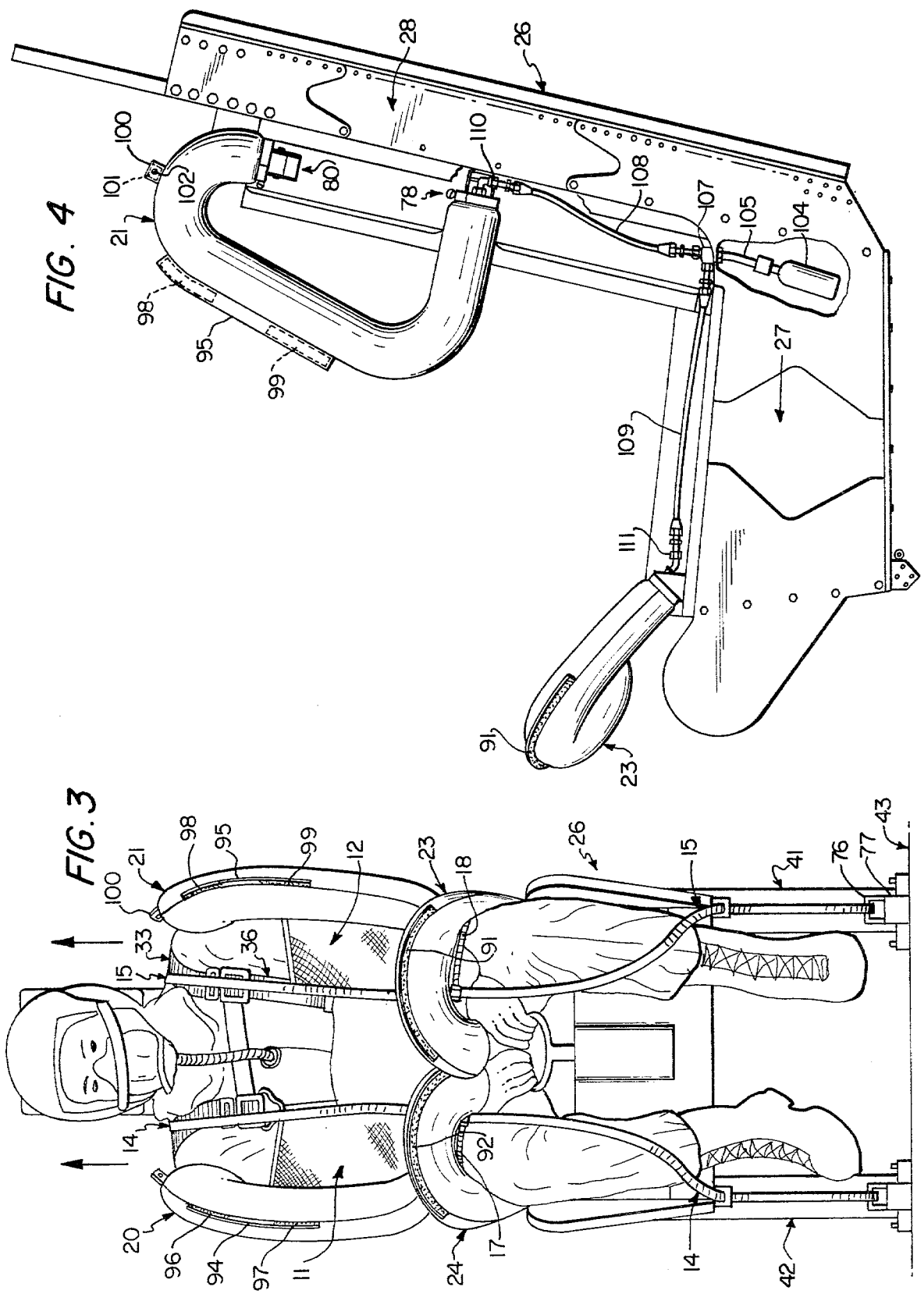

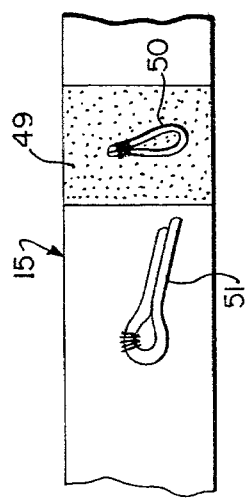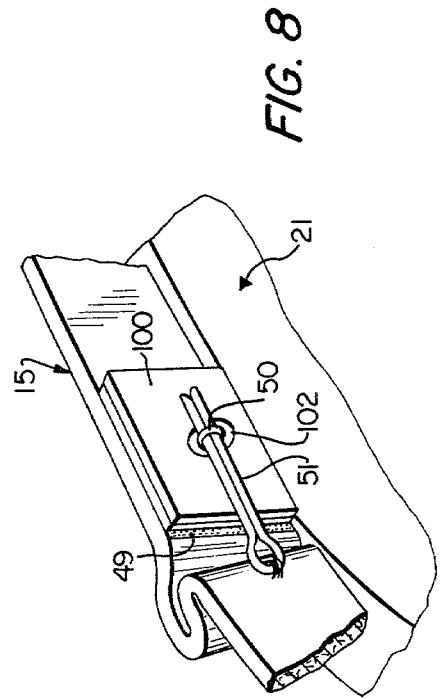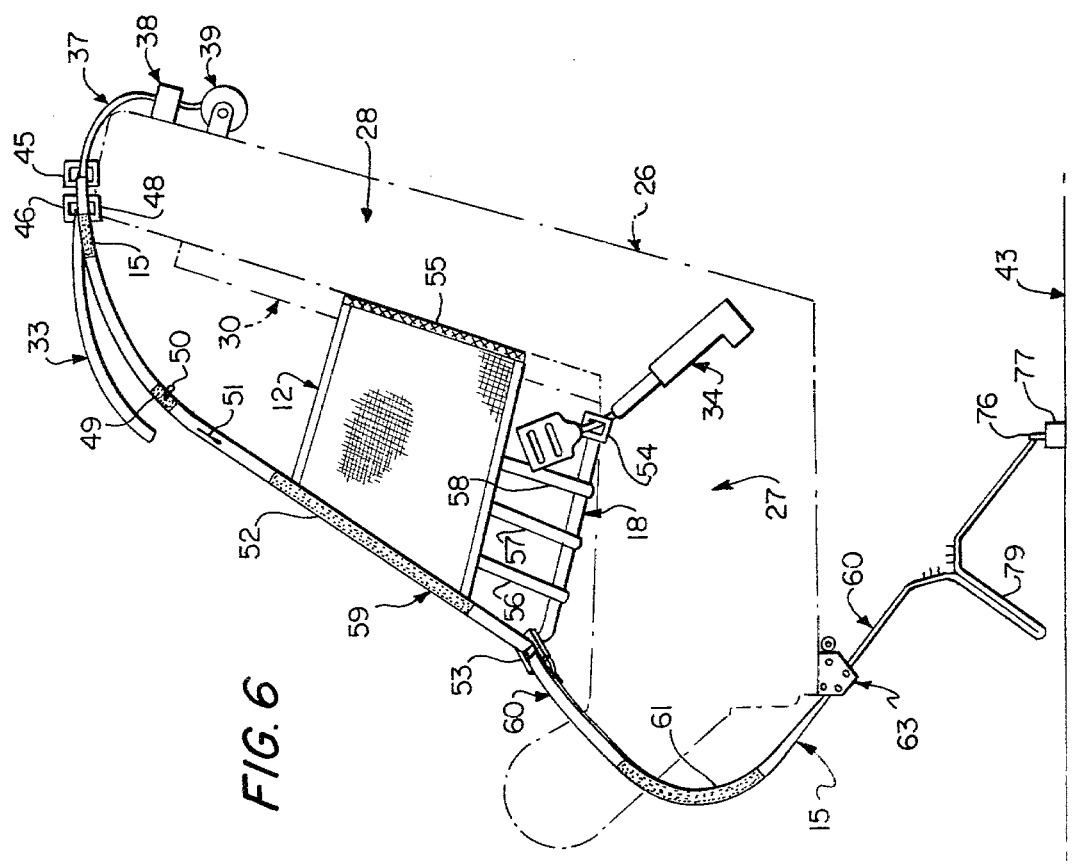

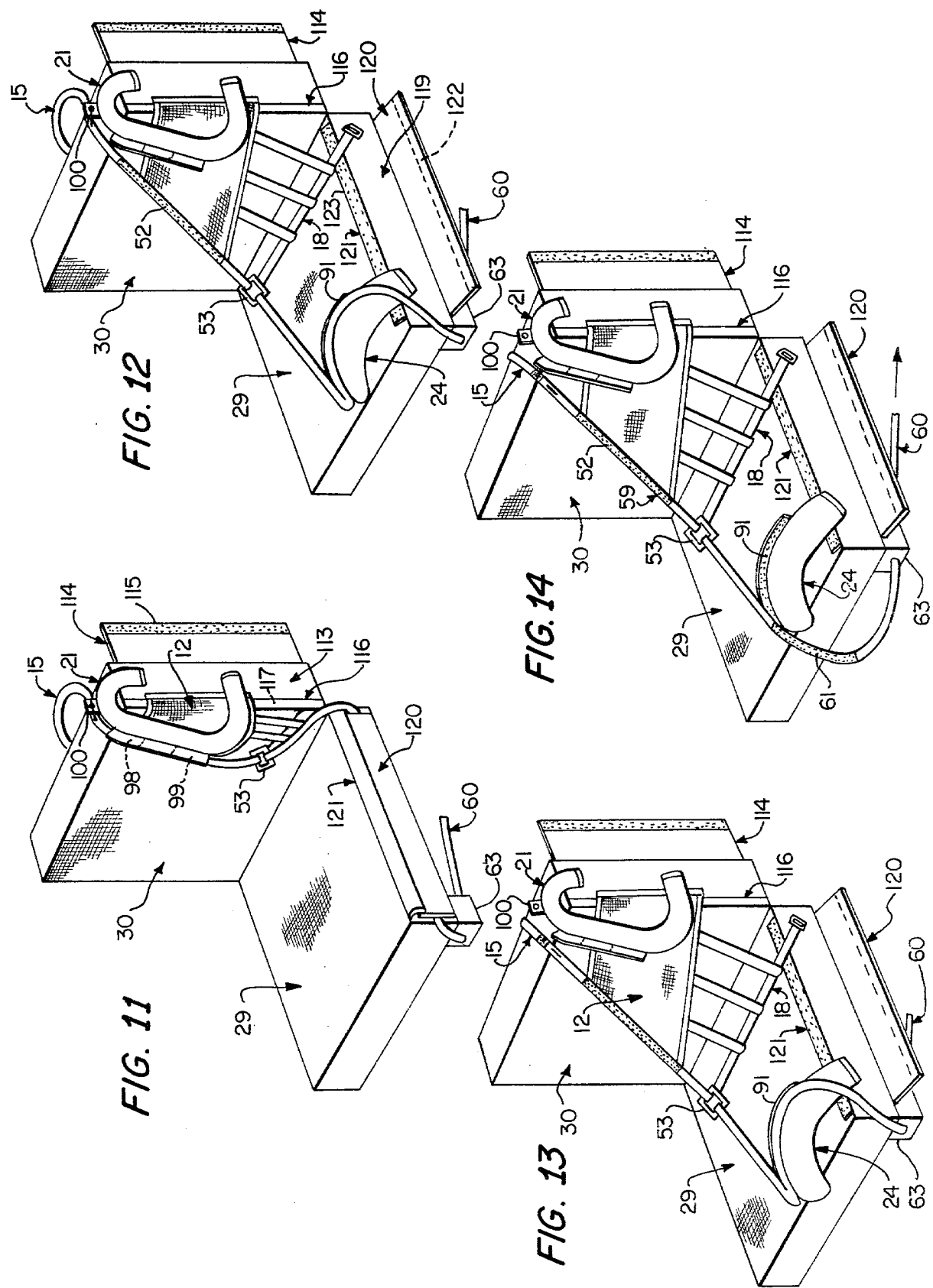

LIMB RETENTION SYSTEM FOR AIRCRAFT EJECTION SEAT

FIELD OF THE INVENTION

The invention relates to a limb retention system for aircraft ejection seats to minimize pilot flail injury upon ejection. The retention system restrains the pilot's arms and legs via straps and nets. The retention system is stowed in the sides of the back and pan cushions of the seat and is deployed by four inflatable bladders, two at the knees and two at the shoulders of the pilot.

BACKGROUND OF THE INVENTION

In recent years much interest has focused on injuries to pilots ejecting from aircraft travelling at 400-600 knots. These injuries are caused by the exposure of the pilot to the extremely high relative windstream and include dislocation or breaking of the pilot's arms or legs as they flail away from the pilot's torso.

While various attempts have been made to reduce these injuries by means of restraining the pilot's limbs, they have not been satisfactory for various reasons. For example, some of these prior art limb retention systems do not deploy quickly or reliably and some of the systems actually cause injuries by contact with the ejecting pilot. In addition, many of these prior art devices require substantial modification to the ejection seat or require the pilot to wear additional devices or to hook up to additional equipment. Moreover, many of these prior art devices merely restrain the arms of the pilot and not the legs.

Examples of such prior art devices include those disclosed in U.S. Pat. Nos. 3,083,938; 3,214,117; 4,081,156; and 4,215,835. Additional disclosures are also found in British Pat. Nos. 927,913; 1,316,854; 1,570,283 and 1,567,385; and in German Pat. No. 2,653,369.

SUMMARY OF THE INVENTION

Accordingly, a primary object of the present invention is to provide a limb retention system for aircraft ejection seats that minimizes flail injuries to both the arms and legs of the pilot.

Another object of the present invention is to provide such a system that deploys quickly and reliably and will not injure the ejecting pilot.

Another object of the present invention is to provide such a system which deploys upon initiation of ejection of the seat and releases the pilot at the seat/pilot separation.

Another object of the present invention is to provide such a system which remains with the pilot and seat as the seat ejects out of the aircraft.

Another object of the present invention is to provide such a system which easily stows in a conventional seat without considerable evidence of its presence and with no major modification of the conventional ejection seat.

Another object of the present invention is to provide such a system which is passive so that the pilot need not hook up to additional equipment and need not wear additional devices.

Another object of the present invention is to provide such a system where the deployment system for the retention system includes soft, inflatable bladders and a stowage assembly for stowing the retention system is located in the cushions of the ejection seat.

The foregoing objects are basically attained by providing a pilot limb retention system for an aircraft ejection seat, the combination comprising two main straps having fore and aft ends; a first mechanism for securing the aft ends of the main straps to the seat; a second mechanism for securing the fore ends of the main straps to the seat; two nets, each secured between one of the main straps and the seat; a stowage assembly for stowing the main straps and the nets on opposite sides of the seat; and an inflatable deployment system for deploying the main straps and nets about the arms and legs of the pilot in the seat upon initiation of ejection of the seat from the aircraft.

Advantageously, the inflatable deployment system comprises four inflatable bladders, two at the knees and two at the shoulders of the pilot, these bladders being secured to the seat.

The stowage assembly comprises compartments in the seat with flaps to releasably close these compartments with the bladders and retention system therein. Advantageously, these compartments are formed as part of the back and pan cushions of the seat.

The four bladders are releasably coupled to the main retention straps by means of hook-and-eye fasteners, commonly sold under the trademark Velcro. Once the bladders are fully inflated, the main straps are tightened to both pull them fully away from the bladders and to restrain the pilot's arms and legs.

Other objects, advantages and salient features of the present invention will become apparent from the following detailed description which, taken in conjunction with the annexed drawings, discloses preferred embodiments of the present invention.

DRAWINGS

Referring now to the drawings which form a part of this original disclosure:

FIG. 1 is a side elevational view of a pilot located in a conventional ejection seat in an aircraft before initiation of ejection, the seat having the limb retention system of the present invention stowed therein;

FIG. 2 is a side elevational view of the pilot and seat shown in FIG. 1 except that ejection has been initiated and the limb retention system has been fully deployed;

FIG. 3 is a front elevational view of the pilot, seat and limb retention system shown in FIG. 2;

FIG. 4 is a side elevational view of the port deployment system as shown in FIG. 2 with parts removed for clarity;

FIG. 6 is a side elevational view of the retention system shown in FIG. 2 with parts of the deployment system removed for clarity;

FIG. 7 is a fragmentary side elevational view of a portion of one of the main straps in the retention system;

FIG. 8 is a fragmentary side elevational view of the main strap shown in FIG. 7 coupled to one of the aft inflatable bladders;

FIG. 11 is a schematic perspective view of the retention system with the port aft bladder initially deployed from the stowed position;

FIG. 12 is a schematic perspective view similar to that shown in FIG. 11 except that the fore bladder has also been inflated and deployed from the stowed position;

FIG. 13 is a schematic perspective view similar to that shown in FIG. 12 except that the fore bladder has moved forward an additional distance and the connection of the main strap to the aft bladder shown in FIG. 8 has been disconnected;

FIG. 14 is a schematic perspective view similar to that shown in FIG. 13 except that the main strap has been tightened causing it to be removed from the fore bladder.

DETAILED DESCRIPTION OF THE INVENTION

Figure 5:
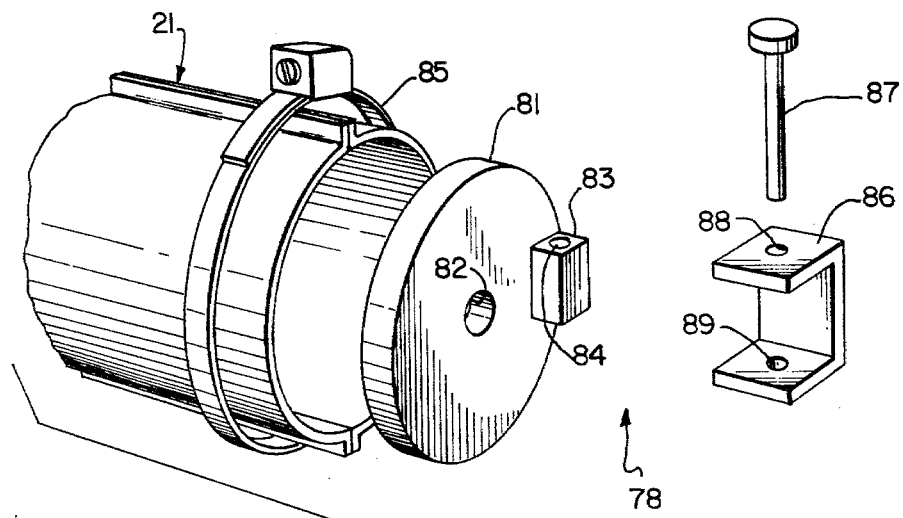
FIG. 5 is an enlarged, exploded perspective view of the coupling assembly for the aft inflatable bladder shown in FIG. 4.

As seen in FIGS. 1–3, the limb retention system 10 in accordance with the present invention comprises a starboard net 11, a port net 12, a starboard main strap 14, a port main strap 15, a starboard secondary strap 17 and a port secondary strap 18.

This retention system is deployed by four inflatable bladders including starboard and port aft bladders 20 and 21 and starboard and port fore bladders 23 and 24.

As seen in FIG. 1, the pilot P is sitting in a conventional ejection seat 26 having a substantially horizontal seat pan 27 and an upright seat back 28. The seat pan has a pan cushion 29 and the seat back a back cushion 30. The pilot is retained conventionally in the seat by means of a lap belt 32 and a shoulder harness 33. The lap belt 32 is releasably connected to the seat by means of a conventional pair of lap belt gas operated release devices 34 on opposite sides of the seat. At the appropriate time for seat/pilot separation after ejection, the lap belt release devices will activate to release the belt from the seat. The shoulder harness 33 is connected to the pilot's chest harness 36, seen in FIG. 3, and is also connected to two inertia straps 37 which pass through conventional gas activated guillotines 38 and are connected to gas operated conventional rotary inertia reels 39. As seen in FIG. 1, the inertia reels and guillotines are connected to the seat back 28. In a conventional manner, upon initiation of the ejection of the seat, the inertia reels 39 will tighten the inertia straps and therefore the shoulder harness 33 and chest harness 36 connected thereto to pull the pilot against the seat back 28. At the appropriate time for seat/pilot separation, the guillotines 38 are activated to sever the inertia straps, thereby freeing the shoulder harness 33 and allowing the pilot to separate from the seat.

As seen in FIGS. 1–3, the seat 26 is supported by conventional catapult rails 41 and 42 which are in turn rigidly connected to the aircraft frame 43. In a conventional manner, various pyrotechnic devices are built into the seat so that upon actuation the seat 26 will move out of and away from the aircraft frame 43 guided by rails 41 and 42.

As seen in FIGS. 2 and 3, as the seat 26 moves away from the aircraft frame 43, the limb retention system 10 in accordance with the present invention is fully deployed to restrain the limbs of the pilot to minimize injuries caused by a flailing of the limbs in the relative windstream to which the pilot is exposed upon ejection from the aircraft. Before ejection and such deployment, the limb retention system is fully stowed, as will be described in more detail hereinafter, as shown in FIG. 1 where there is little evidence of the retention system.

The limb retention system, deployment system and stowage assembly each have port and starboard elements that are mirror images of each other; however, for brevity, only the port elements and functions will be described in detail.

Limb Retention System

Referring now to FIGS. 2, 3 and 6, the limb retention system 10 port side is shown in detail. As seen in FIG. 6, the port main strap 15 has a slip fitting or link 45 rigidly secured at the aft end, such as by looping the strap about the link and stitching the strap, which link is slidably received over the inertia strap 37. In turn, the inertia strap 37 is rigidly connected to the shoulder harness 33 via link 46, link 45 being aft of link 46. Thus, when the inertia strap 37 is tightened by the inertia reel 39 it will pull the link 46 in the aft direction which will contact link 45 and thereby also pull the main strap 15 in the aft direction.

Adjacent link 45 on the main strap 15 is a strip 48 of hook-and-eye fasteners rigidly connected thereto, such as by stitching, such fasteners commonly being sold under the trademark Velcro. Further down the main strap 15 is rigidly connected, such as by stitching, a patch of hook-and-eye fasteners 49 with a loop of cord 50 stitched to the center, as also seen in FIG. 7. Adjacent the patch 49 is a cotter pin 51 stitched to the main strap 15. Still further down the main strap 15 is a strip 52 of hook-and-eye fasteners stitched to the strap adjacent the connection of the port net 12 to the strap, such net and strap connection also being by conventional stitching. Below the net 12, the main strap 15 enters a slip fitting or link 53 and then doubles back as the secondary strap 18 which has a link 54 at the end which receives a portion of the lap belt therein, thereby securing the secondary strap to the lap belt release device and the seat 26.

The net 12 on the edge opposite the main strap 15 is rigidly secured, such as by stitching 55 to the back cushion 30 of the seat back 28. Extending downwardly from the bottom of net 12 are three fabric loops 56, 57 and 58 which are rigidly secured, such as by stitching, to the bottom of the net and slidably receive the secondary strap 18 at the bottom thereof.

Figure 9:
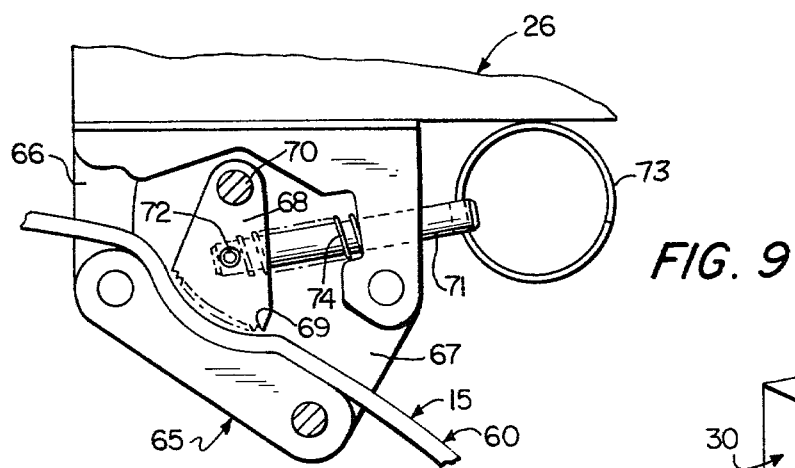
FIG. 9 is a side elevational view of a one-way snubber coupling one of the main retention straps to the forward end of the seat with the cover of the snubber removed.

As seen in FIG. 6, the main strap 15 is divided into two parts via link 53 including an upper part 59 and a lower part 60. Part 60 has an additional strip 61 of hook-and-eye fasteners rigidly secured thereto, the lower part 60 then passing through a one-way snubber or ratchet assembly 63 which is rigidly secured to the bottom of the seat 26, as also shown in FIG. 9. This snubber is comprised of a hollow housing 65 having an inlet 66 and outlet 67 for the lower part 60 of the main strap 15 and having an arm 68 with teeth 69 at the end thereof engagable with the main strap 15. This arm is pivotally mounted in the housing via pivot pin 70 and is biased against the main strap via rod 71 suitably received in a bore in the arm coupled thereto by a transverse pin 72, the rod 71 having a ring 76 at the distal end on the outside of the housing and a spring 74 mounted between a portion of the housing and the arm 68. Thus, the main strap 15 can be pulled in the aft direction as seen in FIGS. 6 and 9 to tighten the main strap 15 but cannot be pulled in the other direction. This snubber also thereby couples the fore end of the main strap 15 to the seat 26.

As seen in FIG. 6, the lower part 60 of the main strap is rigidly connected at its distal end by means of a link 76 rigidly attached to the strap and also rigidly attached to a support 77, which is in turn rigidly attached to the aircraft frame 43. This is also seen in FIGS. 1–3. Between the one-way snubber 63 and the support 77 is a tear-away portion of the lower part 60 of the main strap 15 doubled against itself and connected by rip-stop stitching. As seen in FIG. 2, when the seat 26 moves away from the aircraft frame 43 the stitching in the tear-away portion separates to provide slack to the lower part 60 of the main strap 15. If desired, the two parts of the strap making up the tear-away portion can be two separate pieces coupled by the stitching.

As basically seen in FIG. 3, the starboard side of the seat 26 has the same elements and connections on the starboard main strap 14, starboard net 11 and starboard secondary strap 17 as described above for the port side and as shown in FIG. 6. Although not shown, the lower parts of both main straps 14 and 15 could be attached to an automatic rotary reel to reel in the straps relative to the seat. Advantageously, the strips and patches on the straps have the hook component of the hook-and-eye fasteners. The nets and straps can be made of nylon or Kevlar materials.

Deployment System

As seen in FIGS. 3, 4 and 5, the deployment system basically includes the two aft bladders 20 and 21 on the starboard and port sides of the seat 26 and two fore bladders 23 and 24 on the starboard and port sides of the seat. Essentially, as seen in FIGS. 2 and 3, the aft bladders 20 and 21 are adjacent the shoulders of the pilot while the fore bladders 23 and 24 are adjacent the knees of the pilot, when deployed. The aft bladders 20 and 21 are secured on opposite sides of the seat back 28 while the fore bladders 23 and 24 are secured on opposite sides of the seat pan 27.

As seen in FIG. 4, the port aft bladder 21 is substantially C-shaped and is pivotally connected at the distal ends to the seat back 28, these two pivotal connections 78 and 80 being about axes which are perpendicular. Both of these pivotal connections have a similar construction which is shown in more detail in FIG. 5. Thus, for the lower distal end of bladder 21 there is a metallic disc 81 which has a central bore 82 and an upstanding block 83 having a bore 84 therein. This disc 81 fits inside the end of bladder 21 and is clamped by means of a conventional clamp 85. To minimize the chance of the clamp cutting through the bladder, it is helpful to have a double thickness of the bladder inside the clamp, which can be provided by an additional sleeve of bladder material interposed between the bladder shown in FIG. 5 and the peripheral rim of disc 81. In addition, in order to insure a fluid tight connection between the bladder and the disc 81, a strip of sealing material can advantageously be placed around the rim of the disc. The disc 81 is pivotally connected to a yoke 81, which is rigidly coupled to the seat, by means of a pin 87 passing two aligned bores 88 and 89 in the yoke and through the bore 84 in block 83 on the disc. The disc 81 shown in FIG. 5, having the central bore 82 therein, is for the lower end of the bladder 21 seen in FIG. 4. A similar disc for supporting and closing the other upper end of the bladder 21 does not have a central bore.

A similar connection is provided at the end of the substantially J-shaped fore bladder 23 seen in FIG. 5 except that no tilting or pivoting is necessary. Advantageously, the disc used inside the end of the fore bladder is at an angle of substantially 45° from the horizontal plane containing the seat pan of the seat 26.

The starboard aft bladder 20 and fore bladder 24 are supported in a manner similar to the port bladders.

All four of the bladders are advantageously formed from urethane coated Kevlar/Nomex, each being formed by two halves heat sealed together along their peripheral edges. This material will provide a tear strength in the warp direction of 57 pounds and in the fill direction of 68 pounds. Similarly, this material will provide a tensile strength in the warp direction of 272 pounds per inch and in the fill direction 310 pounds per inch. Advantageously, the material forming the bladders is cut in line with the selvage edge.

As seen in FIGS. 2, 3 and 4, the fore bladders 23 and 24 have along their upper edge, respectively, two curvilinear strips 91 and 92 of hook-and-eye fasteners stitched to extensions formed by extending the edges of the two halves of the two bladders. These strips 91 and 92 releasably receive the strips 61 on the lower parts of the main straps 14 and 15.

Similarly, the aft bladders 20 and 21 have extensions 94 and 95, respectively, formed from the edges of the material forming the two halves of each of the bladders, which extensions have two separate strips of hook-and-eye fasteners rigidly secured thereon such as by stitching. In the case of extension 94 of bladder 20 seen in FIG. 3, these strips are designated 96 and 97 and in the case of extension 95 on bladder 21 these strips are designated 98 and 99. As best seen in FIG. 3, these strips face inward of the seat towards the pilot. These strips will be releasably secured to strips 52 on the main retention straps 14 and 15 so as to releasably couple the straps to the bladders.

As seen in FIG. 4, an additional patch 100 is formed at the top of the aft bladders by an extension of the material forming the two halves, the side facing the pilot supporting a short strip 101 of hook-and-eye fasteners, the strip and patch having an aperture surrounded by an eyelet 102 in the center thereof.

This is shown in more detail in FIG. 8 in which the main strap 15 is connected to the patch 100 so that there is some slack in the strap during tightening. This is accomplished by connecting the hook-and-eye patch 49 on strap 15 to the hook-and-eye strip 101 on patch 100 while maneuvering loop 50 through the eyelet 102. Then, the cotter pin 51, rigidly connected to the main strap 15, is maneuvered through the loop 50 extending through the eyelet 102. Thus, the main strap is connected to the bladder and there is also some slack to the main strap. Upon deployment of the fore bladder, which would tend to pull the main strap towards the front of the seat, there is a short time delay in separation of the main strap 15 from the bladder 21 until the cotter pin 51 is pulled out of the loop 50 and the slack is taken up.

Advantageously, the strips and patches on the bladders have the eye component of the hook-and-eye fasteners.

As seen in FIG. 4, a container 104 for inflating gas is carried by the seat 26, this gas being compressed air or nitrogen or combustion gases from pyrotechnic material. A conduit 105 extends from the container 104 to a Tee connection 107, which has two conduits 108 and 109 extending therefrom. Conduit 108 has a connection 110 at the end thereof for connection with disc 81 and central bore 82 seen in FIG. 5 to deliver inflating gas to the aft bladder 21. Conduit 109 extends from the Tee connection 107 to a connection 111 to deliver gas to the fore bladder 23. As an example, nitrogen under a minimum pressure of 1200 psi to a maximum pressure of 1600 psi can be located in the container 104 which is capable of delivering a working pressure to the bladders of 40–60 psi in each bladder. Advantageously, the gas propulsion will be sufficient to fully deploy the retention system within 150–250 milliseconds. The gas for inflating the bladders will be released upon initiation of the ejection sequence by the pilot such as by the opening of a valve or ignition of pyrotechnic material.

A similar bladder construction and inflation system is provided for the starboard bladders 20 and 24.

Stowage Assembly

Figure 10:
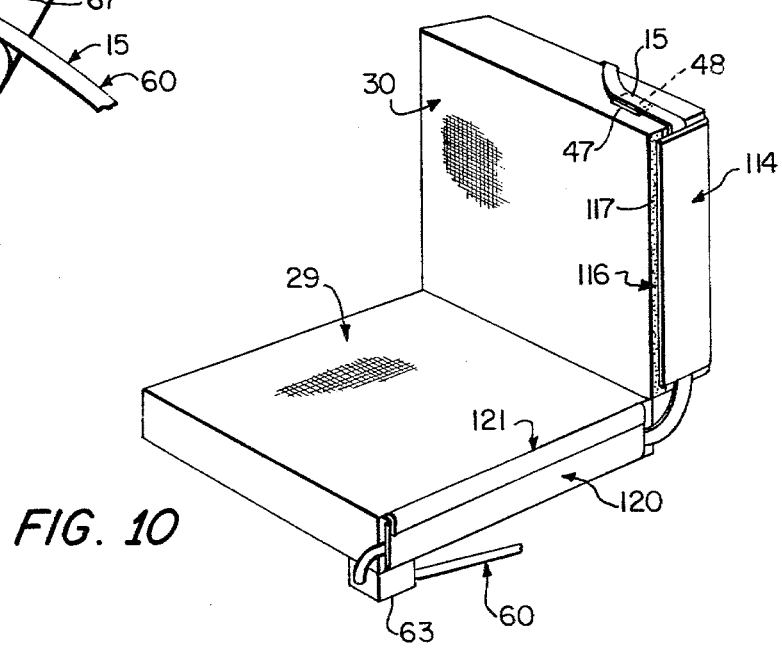
FIG. 10 is a schematic perspective view showing the port side of the retention system in the stowed position.

Referring now to the schematic representation of FIG. 10, the major part of the retention system 10 is shown stowed so there is very little evidence of its existence in the cockpit of the airplane. Advantageously, the system is stowed in the sides of the pan cushion 29 and back cushion 30 by means of a system of flaps.

Referring to FIGS. 10 and 11, it is seen that an aft compartment 113 is formed on the rear of the back cushion 30 by means of a major flap 114 integrally formed with the side of the cushion and having a hook-and-eye fastener strip 115 at its distal edge and a second smaller flap 116 integrally formed with the front of the cushion and having a similar hook-and-eye fastener strip 117 thereon for mating with strip 115. This mating provides a releasable closure for the compartment 113 thereby formed which will contain the uninflated bladder 21, the port net 12 and a major portion of the main strip 15 therein.

As seen in FIGS. 10, 11 and 12, a similar fore compartment 119 is formed on the side of the pan cushion 29 by means of overlapping major and minor flaps 120 and 121 which have mating corresponding hook-and-eye fastener strips 122 and 123 respectively thereon. Compartment 119 receives therein the lower part of the main strap 15 as well as the fore port bladder 24.

As seen in FIG. 10, the main strap 15 is releasably coupled to the top of the back cushion 30 by means of the strip 48 of hook-and-eye fasteners on the strap and a similar strip 47 stitched to the cushion top.

As is readily seen from FIGS. 10–14, as well as FIGS. 1 and 2, upon inflation of the four inflatable bladders, the flaps closing the compartments will be released from their hook-and-eye fasteners and open under the influence of the expanding bladders.

Although only the port side of the stowage assembly is shown in FIGS. 10–12 and 1 and 2, it is apparent that a similar corresponding stowage assembly for the starboard side of the retention system is provided in the cushions 29 and 30.

In stowing the fore bladders 23 and 24, it has been found advantageous to wrap the outer end of each with two hook-and-eye fastener strips to somewhat delay the inflation of the fore bladders so that they inflate shortly after the aft bladders. In addition, the various parts of the retention system and the deployment system should be very carefully collapsed and placed into the respective compartments so that, upon inflation of the bladders, the bladders and associated elements will deploy without fouling.

Operation

The first step in deploying the limb retention system 10 is activation of the ejection mechanism to eject the seat 26 from the aircraft. This activation also activates the gas in container 104 to begin inflation of the bladders and activates the inertia reels 39 to pull the inertia straps 37, harness 33 and main straps 14 and 15 rearward.

The aft bladders 20 and 21 are the first to inflate and upon inflation they brake out of the compartments in the back cushion by opening the flaps releasably closing the compartment, as shown in FIG. 11 regarding the port side. As the aft bladder 21 inflates it carries the main strap with it via the hook-and-eye connection of strip 52 on main strap 15 and strips 98 and 99 on bladder 21. The same is true regarding strap 14 and starboard bladder 20.

The fore bladders then inflate and break the tie straps around them and also open the flaps 120 and 121 on both sides of the seat pan cushion. As the fore bladder 24 expands to the inflated position shown in FIG. 12, it also carries the main strap 15 with it via the hook-and-eye strips 91 on the bladder and 61 on the strap. This is shown in FIG. 12. The same is true regarding strap 14 and starboard fore bladder 24.

As seen in FIGS. 11 and 12, the inflation of the fore bladders also causes the main straps to strip off the aft bladders to positions across the shoulders and, with the aid of the nets, sweep the pilot's arms inboard and captures them.

As the inflation of the fore bladder 24 continues, the cotter pin 51 and loop 50 connection shown in FIGS. 8 and 12 is released allowing the main strap 15 to be completely disconnected from the aft bladder 21.

This also pulls the main strap completely over the shoulder of the pilot and more fully deploys the net 12 over the pilot's arms and the secondary strap 18 over the pilot's thigh as seen in FIGS. 2 and 13.

During this sequence, the seat 26 moves outward from the aircraft from a position shown in FIG. 1 to that approximating the position shown in FIG. 2 and with such an outward movement the lower part 60 of the main strap is pulled through the snubber 63 so as to pull the lower part of the main strap 15 from bladder 24 by releasing the hook-and-eye strips 61 on the strap and 91 on the bladder, as shown in FIG. 14. This movement also tightens the strap 15 so that the limb retention system is fully deployed with the lower part of the main strap 15, as seen in FIG. 3, coming across the shin of the pilot's leg. The same is true regarding the main strap 14. Full deployment of the limb retention system is preferably accomplished after 12 to 24 inches of vertical movement of the seat relative to the aircraft.

Thus, as the pilot and the seat enter the relative windstream the arms and legs of the pilot are securely retained so as to minimize flail injury, as shown in FIGS. 2 and 3.

At the appropriate time for seat/pilot separation, the lap belt release devices will release the lap belt 32 and the guillotines 38 will sever the inertia straps 37, seen in FIG. 2. Because the secondary strap 18 is connected to the lap belt, it will be released, and so will the starboard secondary strap 17. In addition, since the upper or aft ends of the main straps 14 and 15 are connected via links 45 to the inertia straps 37, when the straps 37 are severed, the main straps 14 and 15 will also be released from a retaining position relative to the pilot. Thus, seat/pilot separation can take place since the limb retention system is released from the seat.

Modified Stowage Assembly

Figure 15:
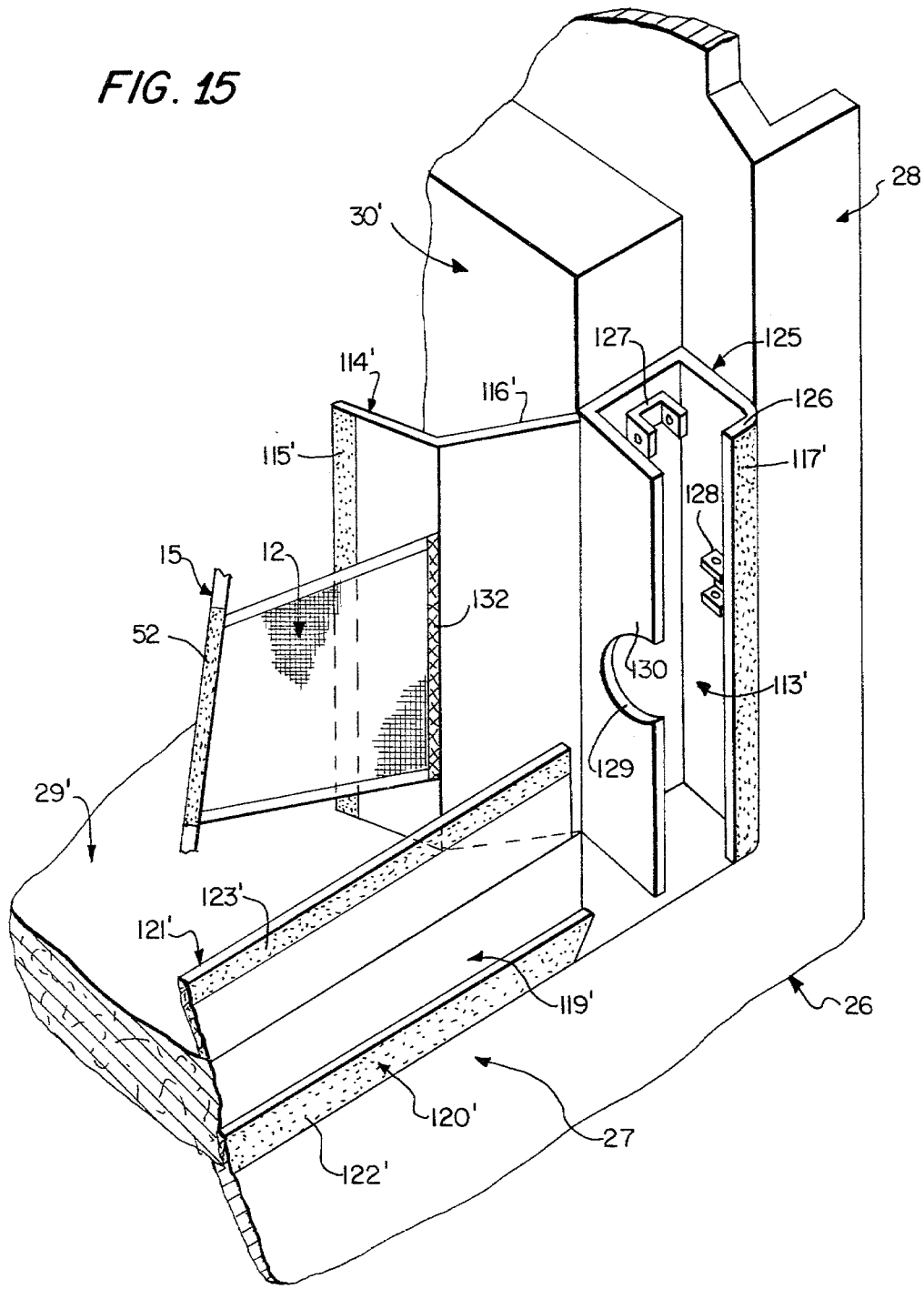
FIG. 15 is a fragmentary perspective view of a modified stowage assembly for the retention system of the present invention with parts removed for clarity.

As seen in FIG. 15, a modified stowage assembly is illustrated which is slightly different from that shown in FIGS. 10–14 and 1 and 2.

The pan cushion 29′ has a fore compartment 119′ on its side for the fore bladder with a major flap 121′ integrally formed at the top edge of the pan cushion and having a strip 123′ of hook-and-eye fasteners at the distal edge, and a minor flap 120′ with a strip of hook-and-eye fasteners 122′ on the bottom edge of the cushion.

The aft compartment 113′ for the aft bladder is formed from a metallic substantially U-shaped channel member 125 supported against the back 28 of the seat 26 and also against the side of the back cushion 30′. The channel member has a lip 126 rigidly supporting a strip 117′ of hook-and-eye fasteners. Rigidly coupled inside the channel member are two yokes 127 and 128 to pivotally mount the two ends of the aft bladder. A cut-out 129 is formed in the forward leg 130 of the channel member about mid-way along the axial length to receive the bottom part of the aft bladder, as also seen in FIG. 4.

Extending from the material of the back cushion 30′ is a base flap 116′ which has integrally formed at its distal edge a flap 114′ with a strip 115′ of hook-and-eye fasteners thereon. The port net 12 is rigidly coupled via stitching 132 at the interface of flaps 114′ and 116′. In stowing the net, main strap and aft bladder in the aft compartment, the base flap 116′ is folded against the forward leg 130 of channel member 125 and the flap 114′ is folded around the channel member 125 so that strip 115′ on flap 114′ is releasably coupled to the strip 117′ on channel member 125.

While various advantageous embodiments have been chosen to illustrate the invention, it will be understood by those skilled in the art that various changes and modifications can be made therein without departing from the scope of the invention as defined in the appended claims.

What is claimed is:

1. A pilot limb retention system for an aircraft ejection seat, the combination comprising:
   two main straps having fore and aft ends;
   first means for securing said aft ends of said main straps to the seat;
   second means for securing said fore ends of said main straps to the seat;
   two nets, each secured between one of said main straps and the seat;
   stowage means for stowing said main straps and nets on opposite sides of the seat; and
   inflatable deployment means for deploying said main straps and nets about the arms and legs of the pilot in the seat upon initiation of ejection of the seat from the aircraft,
   said seat comprising a pan and a back,
   said inflatable deployment means comprising
      two aft inflatable bladders coupled to the seat adjacent the sides of said seat back and each coupled to one of said main straps for moving said main straps inward of the seat over the arms of the pilot,
      two fore inflatable bladders coupled to the seat adjacent the sides of said seat pan and each coupled to one of said main straps for moving said main straps inward of the seat over the legs of the pilot, and
      mean for tightening said main straps and nets over the arms and legs of the pilot to thereby restrain the limbs of the pilot as the seat moves out of the aircraft.

2. A pilot limb retention system according to claim 1, wherein
   said two aft inflatable bladders adjacent the sides of said seat back are substantially C-shaped.

3. A pilot limb retention system according to claim 1, wherein
   said two fore inflatable bladders adjacent the sides of said seat pan are substantially J-shaped.

4. A pilot limb retention system according to claim 1, wherein
   said inflatable deployment means further comprises
      means for releasably coupling each of said two aft inflatable bladders to one of said main straps.

5. A pilot limb retention system according to claim 1, wherein
   said inflatable deployment means further comprises
      means for releasably coupling each of said two fore inflatable bladders to one of said main straps.

6. A pilot limb retention system according to claim 1, wherein
   said means for tightening comprises means for coupling said fore ends of said main straps to the aircraft.

7. A pilot limb retention system according to claim 1, wherein
   said stowage means comprises
      two aft compartments in said seat back and aft flap means for releasably closing said aft compartments, and
      two fore compartments in said seat pan and fore flap means for releasably closing said fore compartments.

8. A pilot limb retention system according to claim 7, wherein
   said seat back comprises a back cushion and said two aft compartments are formed in said back cushion.

9. A pilot limb retention system according to claim 7, wherein
   said seat pan comprises a pan cushion and said two fore compartments are formed in said pan cushions.

10. A pilot limb retention system according to claims 4 or 5 wherein
    said means for releasably coupling comprises a strip of hook-and-eye fasteners rigidly coupled to each of said inflatable bladders and a corresponding strip of hook-and-eye fasteners rigidly coupled to each of said main straps.

11. A method of restraining the limbs of a pilot being ejected from an aircraft in an ejection seat, comprising the steps of
    initiating the ejecting movement of the seat out of the aircraft,
    inflating a pair of bladders to deploy two nets and two straps adjacent the arms of the pilot,
    inflating a second pair of bladders to move the two straps and the two nets over the arms of the pilot, and
    tightening the two straps to move the straps over the legs of the pilot to thereby restrain the limbs of the pilot as the seat moves out of the aircraft.

* * * * *